A. UMLAUF & K. BÖHM.
ELASTIC TIRE FOR WHEELS.
APPLICATION FILED FEB. 3, 1908.

906,834.

Patented Dec. 15, 1908.

2 SHEETS—SHEET 1.

Witnesses:

Inventors
August Umlauf
Kalman Böhm
By
James L. Norris
Atty.

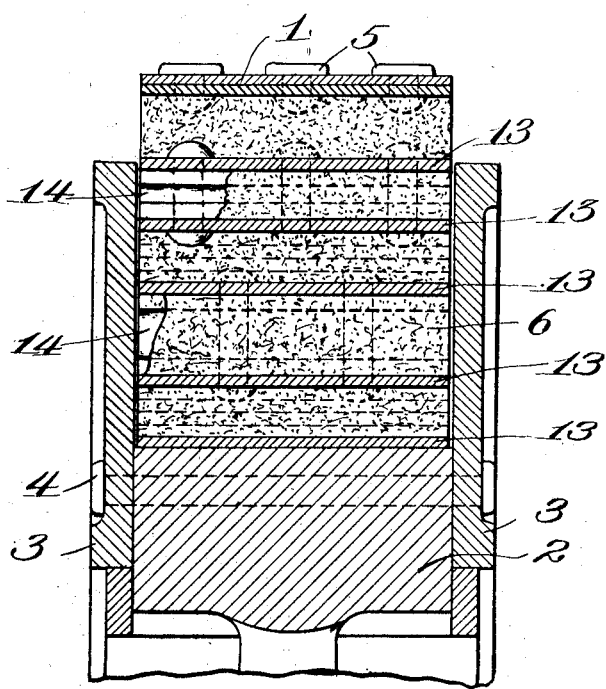
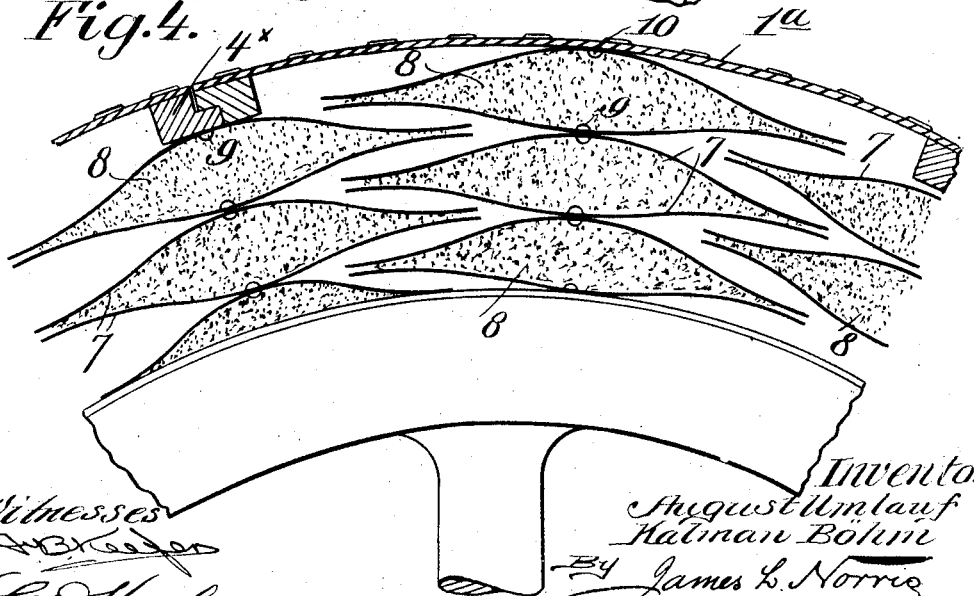

UNITED STATES PATENT OFFICE.

AUGUST UMLAUF AND KALMAN BÖHM, OF VIENNA, AUSTRIA-HUNGARY.

ELASTIC TIRE FOR WHEELS.

No. 906,834. Specification of Letters Patent. Patented Dec. 15, 1908.

Application filed February 3, 1908. Serial No. 414,068.

*To all whom it may concern:*

Be it known that we, AUGUST UMLAUF and KALMAN BÖHM, subjects of the Emperor of Austria-Hungary, both residing at Vienna, Austria-Hungary, have invented certain new and useful Improvements in Elastic Tires for Wheels, of which the following is a specification.

The present invention relates to improvements in vehicle tires, and it has for its object primarily to provide a tire of this character which embodies resilient cushions which are composed of spring elements the elasticity of which is sufficient to sustain the normal strains and vibrations, and such spring elements are so constructed as to form spaces to contain a filler, the latter being composed preferably of a mass of elastic material, the filler acting when the spring is subjected to an abnormal pressure, as a substantially rigid mass which completely fills the space provided in each spring element and thereby prevents injurious compression of the cushion, although the filler will permit normal action of the spring elements.

Another object of the invention is to provide improved cushions of this character which comprise sets of radially superposed spring plates the combined elasticity of which affords the requisite resilience for the wheel, these superposed spring plates forming spaces to contain the elastic filler.

A further object of the invention is to provide a vehicle tire of this character wherein the cushions are composed of a plurality of segmental sections which encircle the periphery of the wheel, these sections coöperating so as to retain one another in proper position upon the wheel, and their separate or individual formation enables them to be readily mounted and detached from the wheel for the purposes of repair.

Figure 1:
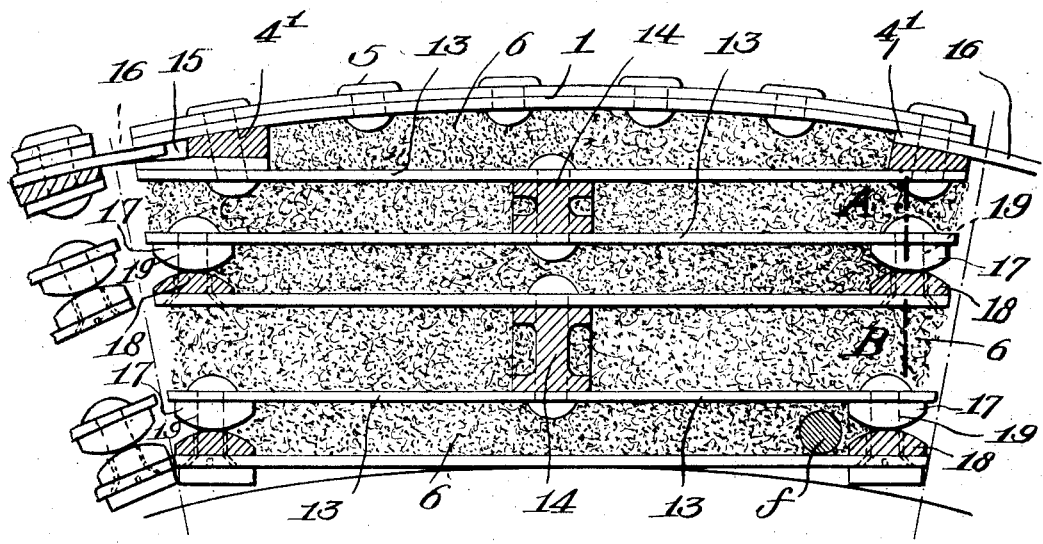
Figure 2:
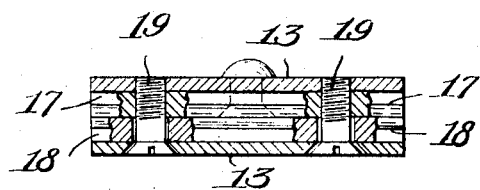

To these and other ends, the invention consists in certain improvements, and combinations and arrangements of parts, all as will be hereinafter more fully described, the novel features being pointed out particularly in the claims at the end of the specification.
In the accompanying drawing: Figure 1 represents a section of a wheel taken in the plane of rotation thereof, showing a tire section constructed in accordance with the present invention, the cushion being composed of a series of superposed spring plates between which the elastic fillers are interposed; Fig. 2 represents a transverse section on the line A—B of Fig. 1; Fig. 3 represents a cross section of the rim of a wheel equipped with an elastic tire as shown in Fig. 1; and Fig. 4 is a sectional view similar to Fig. 1 showing another form of the invention.

Similar parts are designated by the same reference characters in the several views.

In that form of the invention shown in Figs. 1, 2 and 3, 2 represents the rim of a wheel the periphery of which is preferably flat to form a seat for the cushion elements, and a pair of retaining flanges 3 are arranged at the opposite sides of the wheel rim and are retained in proper position by one or more transverse bolts 4.

In the present instance, the tire is composed of a series of individual sections which are arranged around the periphery of the wheel and between the lateral retaining flanges thereon. In that form of the invention shown in Figs. 1 to 3, inclusive, each tire element is composed of an outer curved plate 1 which serves as a tread surface and for this purpose it may be provided with studs 5 whereby the requisite traction may be obtained. Between this tread surface and the periphery of the wheel is arranged a set of superposed cushions, those shown in the present instance being superposed radially and each cushion is composed of a pair of spring plates 13, the spring plates in the present instance extending in parallel relation and are spaced radially to form spaces to contain the elastic filler. The opposite ends of each pair of spring plates bear upon one another through the medium of rockers 17 and 18, these rockers being arranged on proximate faces of each pair of the plates and their engaging surfaces are preferably rounded so as to permit relative bending of the plates, and screws or bolts 19 pass through the respective ends of each pair of plates and through the rockers and thereby serve to connect the plates to prevent relative displacement thereof, although these screws or bolts have a sufficiently loose fit as to permit the necessary yielding of the plates. The cushions formed by each pair of spring plates are connected at intermediate points by webs 14 which may be riveted or otherwise secured in position, and the connection thus provided between the cushions of each tire element serves to retain the several superposed cushions in proper coöperative relation.

The outermost spring plate is connected to the tread portion 1 of the tire element by means of the tapered or wedge-shaped pieces 4' which may be riveted or otherwise secured in position, one of these wedge-shaped or tapered pieces being spaced from its corresponding end of the tire element to form a recess 15 in which a tongue or connecting member 16 may engage, the connection thus provided, however, permitting the necessary yielding movements of the several tire elements, although these tongues will also serve to transmit undue strains from one tire element to those next adjacent thereto. In this form of the invention, a space is formed within each cushion and also between the cushions of each set, and a similar space will be formed between the outermost cushion and the tread surface. These spaces contain fillers 6 which fillers are preferably elastic and may be composed of particles of cork, india rubber, tow and other suitable material having a jelly-like binder. These fillers completely fill the spaces between the spring plates and thereby prevent excessive strain of the springs owing to the fact that the fillers are confined within the spaces provided for them, and when the springs are fully compressed, the fillers are incapable of further compression and thereby act substantially as rigid bodies. A bolt $f$ serves to retain the tire sections upon the wheel.

In that form of the invention shown in Fig. 4, each tire element consists of a curved tread plate $1^a$ within which is inclosed a series of bowed or arched-shaped spring plates 7 which are arranged in pairs, each pair of plates having their concave sides placed together to form spaces within which the fillers 8 of elastic material are contained. Each pair of spring plates in this instance forms a resilient cushion, the cushions being superposed radially upon one another, and their convex sides which are arranged opposite to one another are connected together by means of rivets 9 or other suitable devices. The convex side of the outermost cushion is also secured to the inner side of the tread plate $1^a$ by a rivet 10 or other suitable means.

At the opposite ends of each tire element are arranged rabbeted connecting members $4^x$, the rabbeted member of one tire element having an overlapping engagement with that upon the next adjacent tire element and thereby providing means for transmitting undue strains from one tire element to the other, and these connecting members also serve to maintain the several tire elements in proper alinement about the periphery of the wheel.

An elastic tire constructed in accordance with the present invention is well adapted for use upon motor and other vehicles as it possesses sufficient resilience to reduce vibration to a minimum, and in those forms of the invention shown, the combined action of the several sets of superposed cushions affords the requisite resilience and, moreover, the strain is so distributed among the cushions as to prevent injury thereto. By filling the spaces formed within or between the cushions of each set with an elastic material, the springs are so reinforced as to enable them to resist undue strains without liability of breakage. Moreover, the connection between the several tire elements is such as to permit the proper compression of the several elements and, when undue strain is imposed upon one of the tire elements, such connection will transmit the strain to the adjacent elements. By forming the tire of individual sections or elements, the cushions are rendered readily accessible for the purposes of repair or renewal.

We claim as our invention:

1. An elastic tire for vehicle wheels comprising sets of superposed cushions, each cushion embodying a pair of spring plates constructed and arranged to form filling spaces between them and having their ends arranged to bear upon one another, each cushion being connected intermediately to the intermediate portion of an adjacent cushion of the same set, and a filler of elastic material contained in the said space provided in each cushion.

2. An elastic tire for vehicle wheels comprising a plurality of sections adapted to fit the periphery of a wheel, each section comprising a set of radially superposed spring plates lying in planes transverse to the plane of the tire, and bodies of elastic filling material arranged in the spaces between the spring plates and serving to sustain abnormal strains imposed on the spring plates.

3. An elastic tire for vehicle wheels comprising a plurality of sections adapted to fit the periphery of a wheel, each section comprising a set of superposed parallel spring plates, webs attached to intermediate portions of adjacent plates to connect the latter in pairs, bearing devices interposed between the opposing faces at the ends of the contiguous plates of each pair, said bearing devices having curved coöperating faces, means for connecting said devices and permitting limited relative movement thereof, and bodies of elastic material interposed between the said plates.

In testimony whereof we have hereunto set our hands in presence of two subscribing witnesses.

AUGUST UMLAUF.
KALMAN BÖHM.

Witnesses:
JOSEF RUBARCH,
ROBERT W. HEINGARTNER.